United States Patent [19]

Daudet et al.

[11] Patent Number: 5,044,396
[45] Date of Patent: Sep. 3, 1991

[54] CHECK VALVE FOR FLUIDS

[76] Inventors: Howard C. Daudet, 4635 E. Lafayette Blvd.; Richard O. Washburn, 2535 N. 49th St., #3, both of Phoenix, Ariz. 85008

[21] Appl. No.: 539,923
[22] Filed: Jun. 18, 1990
[51] Int. Cl.⁵ ............................................. F16K 15/03
[52] U.S. Cl. .............................. 137/515.5; 137/527.6; 137/527.8
[58] Field of Search ............... 137/515.5, 515.7, 527.4, 137/527.6, 527.8, 527

[56] References Cited

U.S. PATENT DOCUMENTS

| | | | |
|---|---|---|---|
| 846,317 | 3/1907 | Kiddle | 137/527.4 |
| 4,396,034 | 8/1983 | Cherniak | 137/527.8 |

Primary Examiner—Robert G. Nilson
Attorney, Agent, or Firm—H. Gordon Shields

[57] ABSTRACT

Flapper valve apparatus includes a shell insertable into a line or conduit through which fluid flows. Within the shell is a configured valve seat, and the inner diameter of the valve seat is substantially the same as that of the line in which the valve apparatus is disposed. A flapper element pivots from its closed position against the seat to an open position within the shell, and in the open position the flapper generally conforms to the configuration of the line in which it is disposed for fluid flow purposes. The geometry of the valve apparatus minimizes the pressure drop across the valve and maximizes the flow characteristics of the fluid through the valve.

11 Claims, 3 Drawing Sheets

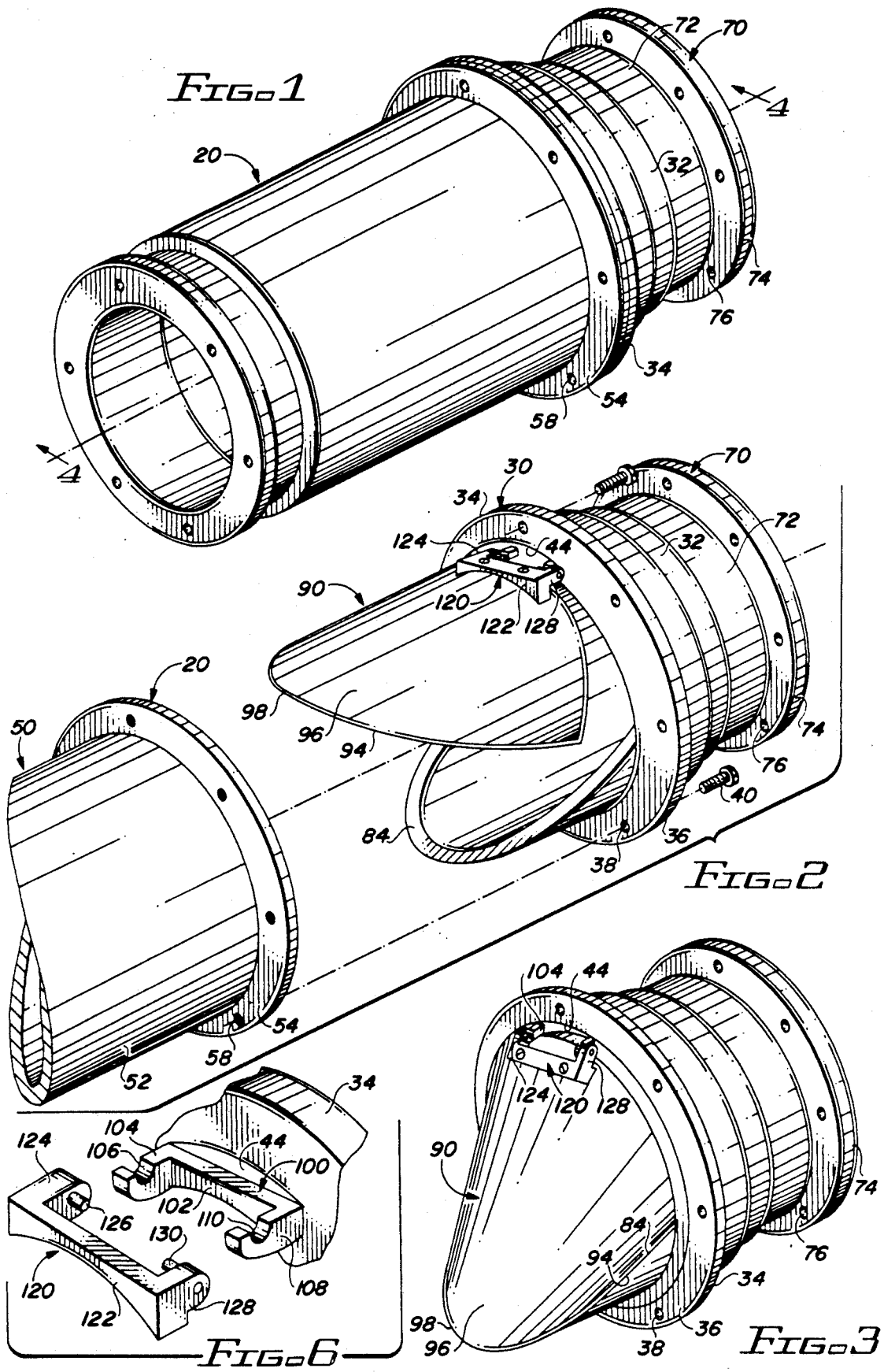

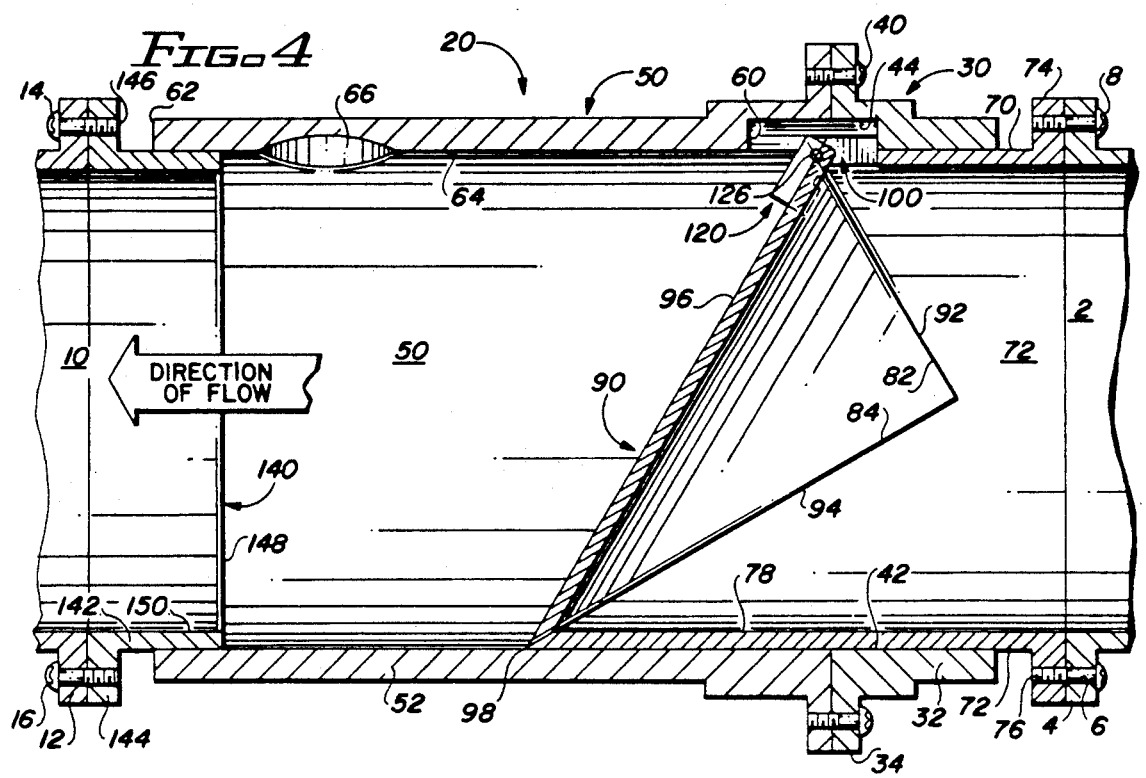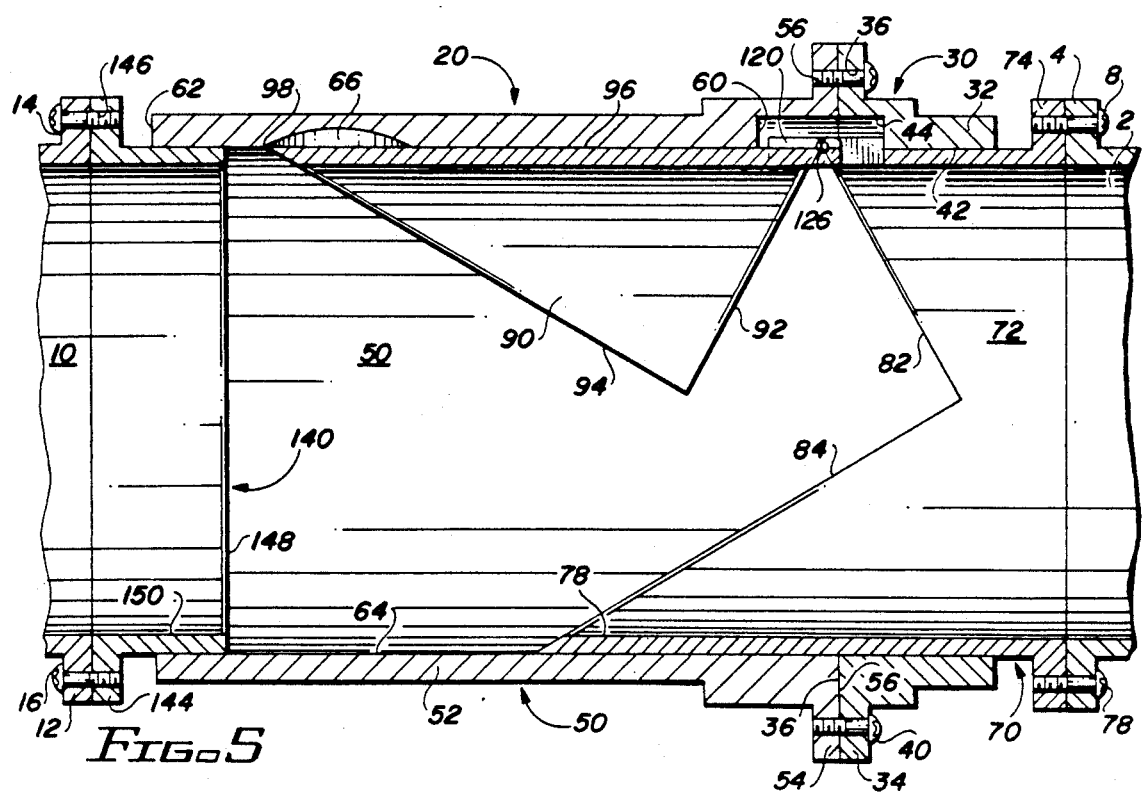

CHECK VALVE FOR FLUIDS

BACKGROUND OF THE INVENTION

1. Field of the Invention

This invention relates to valves, and more particularly, to a flapper type check valve for fluids.

2. Description of the Prior Art

U.S. Pat. No. 173,452 (Donovan) discloses a flapper valve disposed in a tube. The flapper is flat, and it moves toward and away from an elliptical aperture with a flat rim or valve seat. The plane of the rim or valve seat is at an angular orientation with respect to the longitudinal axis of the tube other than perpendicular thereto. The apparatus is referred to as a stench-trap, and it apparently is used to keep sewer gases from escaping from the tube in which it is disposed.

U.S. Pat. No. 364,206 (Baltzley) discloses another type of flapper valve designed to be disposed within a pipe. The flapper valve is disposed within a generally cylindrical or circular frame, but having a longitudinally extending slit or slot between the axial ends so that the frame may be compressed or expanded to fit within any given pipe. The flapper is made of flexible material so that it also may be made to conform to the particular diameter of the frame, and accordingly of the pipe, in which it is disposed.

U.S. Pat. No. 385,292 (Baltzley) discloses a drain tile which includes an integral flapper valve. The flapper pivots on the interior or inside of the drain tile between its up (open) position and its down (closed) position.

U.S. Pat. No. 441,751 (Crowner) discloses a flapper valve disposed within a joint of a drain pipe. The flapper valve is planar in configuration. The flapper and its seat are inserted into the joint and are secured therein.

U.S. Pat. No. 452,750 (Drury) discloses another type of flapper valve used as a sewer trap. The flapper is generally flat or planar. The flapper, and its seat, are inserted at a joint of the pipe. The configuration of the flapper, and its seat, provide a restriction in the pipe, and accordingly flow characteristics through the valve apparatus, and through the pipe, are unimportant.

U.S. Pat. No. 1,000,719 (Cram) discloses another sewer trap flapper valve. The flapper is arcuately formed, and the seat conforms to the arcuate configuration of the flapper.

U.S. Pat. No. 1,103,043 (Grueninger) discloses another type of flapper valve in which the flapper valve element is weighted to prevent fluid flow through the pipe when the valve is closed. The valve is designed to be placed in a down spout and extends out to the side of the down spout. The valve pivots away from its closed position to its open position where it is disposed in its own housing or casing off to the side of the drain pipe. The housing or casing is tapered and intersects a down pipe at an acute angle.

U.S. Pat. No. 2,947,321 (Kovalcik) discloses another type of flapper valve in which the flapper pivots freely from its closed position, which is substantially ninety degrees to the flow of fluid, upwardly to allow fluid to flow. The valve and its tubular body extend into the outer end of a pipe for controlling back flow through the pipe. The apparatus is designed to be used within a catch basin and to prevent water flowing through the pipe into the catch basin from flowing backwardly through the pipe. The flapper is flat and is generally circular to conform to the configuration of its pipe.

U.S. Pat. No. 4,095,615 (Ramsauer) discloses a flapper type check valve disposed within a cylindrical housing and inserted into a pipe as a check valve. The flapper has a curved configuration to generally conform to the interior of its housing when it is in the up or open position.

U.S. Pat. No. 4,396,034 (Cherniak) discloses a flapper type check valve in which the valve itself has a cylindrical cross section and angular edges disposed generally perpendicular to each other such that planes along the edges intersect at substantially ninety degrees. The valve seat includes mating edges. The flapper pivots away from its seat on a pivot axis spaced apart from the flapper and its seat. The curvature of the flapper conforms to the curvature of its housing or valve body.

It will be noted that, in the full open position, flow through all of the flapper type check valves discussed above is impeded by the particular geometry involved. Substantial turbulence results, and there is a substantial pressure drop across each of the valves. For the particular applications discussed in the various patents, such pressure drop is generally not important. There are, however, environments in which a pressure drop across a valve in a relatively low pressure flow is most undesirable.

The apparatus of the present invention has been designed to minimize the pressure drop across the valve and to provide the necessary geometry to maximize the flow through the valve and yet to provide a positive seal when the check valve closes.

SUMMARY OF THE INVENTION

The invention described and claimed herein comprises a flapper type check valve in which the cross sectional configuration of the flapper valve is circular. The check valve is disposed within a housing and in the open position the flapper is disposed substantially against the housing so as to minimize turbulence through the valve and to minimize pressure drop across the valve. The valve apparatus includes a valve seat having planar rims disposed substantially ninety degrees to each other. The seat is disposed in an upstream shell. The pivot axis of the flapper valve is aligned with one of the planar valve seat portions and is tangent to the flapper inner diameter at the flapper valve's upstream shell and tangent to the outer diameter of the valve seat shell and flapper. The particular geometry of the pivot axis of the flapper valve maximizes the flow through the valve apparatus and minimizes turbulence and pressure drop across the valve.

Among the objects of the present invention are the following:

To provide new and useful check valve apparatus;

To provide new and useful flapper type check valve apparatus;

To provide new and useful flapper type check valve apparatus utilizing geometry to maximize flow through the valve and to minimize pressure drop across the valve in the full open position;

To provide new and useful flapper valve apparatus having a valve shell, a valve seat in the shell, and a flapper pivotally secured to the shell and to the valve seat; and To provide new and useful flapper valve apparatus having a flapper pivoting from a closed position to an open position and including a valve shell having a relieved portion for closing the check valve in the absence of gravity by allowing fluid pressure to flow behind the open flapper to urge its closing.

BRIEF DESCRIPTION OF THE DRAWING

FIG. 1 is a perspective view of the apparatus of the present invention.

FIG. 2 is an exploded perspective view of the apparatus of FIG. 1 in the full open position.

FIG. 3 is a perspective view of a portion of the apparatus of the present invention in the full closed position.

FIG. 4 is a view in partial section taken generally along line 4—4 of FIG. 1.

FIG. 5 is a view in partial section of the apparatus of FIG. 4 illustrating the apparatus of the present invention in an open position.

FIG. 6 is an exploded perspective view of the flapper hinge apparatus of the present invention.

DESCRIPTION OF THE PREFERRED EMBODIMENT

Figure 7:
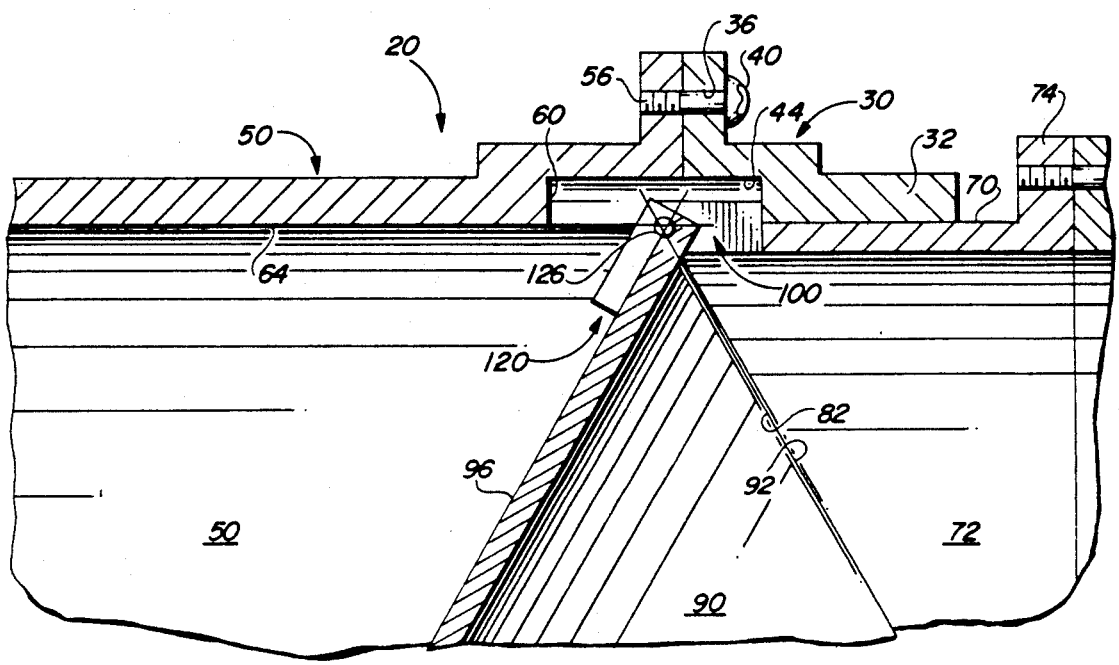
FIG. 7 is an enlarged view of a portion of FIG. 4.

FIG. 1 is a perspective view of valve apparatus 20 of the present invention. FIG. 2 is an exploded view of the valve apparatus 20 of FIG. 1, with a portion of the valve apparatus in the open position. FIG. 3 is a perspective view of a portion of the valve apparatus shown in FIG. 2 with the valve in the closed position.

FIGS. 4 and 5 are views in partial section of the valve apparatus 20 in a use environment. FIG. 4 is taken generally along line 4—4 of FIG. 1, showing the valve apparatus 20 in the closed position. FIG. 5 is similarly taken along line 4—4 of FIG. 1, showing the valve apparatus in the open position. FIG. 5 accordingly generally comprises a side view in partial section of the apparatus of FIG. 2, but with the valve apparatus 20 assembled. For the following discussion concerning the valve apparatus 20, reference will be made to FIGS. 1, 2, 3, 4, and 5, generally. Specific reference to a particular drawing may be made as required.

The valve apparatus 20 includes several portions, including an upstream valve housing or shell 30 secured to a downstream valve housing or shell 50. The upstream housing or shell 30 includes a cylindrical portion 32 with a flange 34 on its downstream end. There is a front face 36 on the end of the flange 34. A plurality of longitudinally extending apertures 38 extend through the flange 34.

Within the cylindrical portion 32 of the upstream valve housing or shell 30 is a bore 42. A hanger recess 44 extends radially outwardly from the bore 42. The hanger recess 44 is at the upper portion of the shell 30, as shown in FIGS. 2, 3, 4, and 5. The recess 44 is disposed within or extends into a thickened portion of the cylindrical portion 32 of the shell 30.

The valve apparatus 20 also includes a downstream valve housing or shell 50. The downstream valve housing or shell 50 includes a cylindrical portion 52. At the upstream end of the cylindrical portion 52 is a radially outwardly extending flange 54. The flange 54 includes a front face 56 which mates with the front face 36 of the upstream valve housing or shell 30.

Extending longitudinally through the flange 54 is a plurality of apertures 58. The apertures 58 are aligned appropriately with the apertures 38 in the flange 34. A plurality of fastening elements, such as screws 40, are used to secure together the two valve housing or shell portions 30 and 50.

A hinge recess 60 extends longitudinally inwardly from the front face 56. The hinge recess 60 is disposed in a thickened portion of the cylindrical portion 52 of the shell 50.

The downstream end of the cylindrical portion 52 includes an end face 62. Within the cylindrical portion 52 is a bore 64. At the upper portion of the bore 64 there is a closing recess or relieved portion 66. The closing recess 66, shown in FIGS. 4 and 5, is spaced apart longitudinally from the end face 62 a relatively short distance. The closing recess 66 will be discussed in more detail below.

As best shown in FIGS. 4 and 5, the bore 42 of the upstream valve housing or shell 30 is generally the same diameter as the bore 64 of the downstream valve housing or shell 50. Moreover, the hanger recess 44 is appropriately aligned with the hinge recess 60 for receiving valve elements, as will be discussed below.

Disposed within the aligned bores 42 and 64 of the valve housings or shells 30 and 50, respectively, is a valve duct 70. The valve duct 70 includes a generally cylindrical portion 72, the outer diameter of which is substantially the same as the diameter of the bores 42 and 64. The valve duct 70 is appropriately secured within the housings 30 and 50.

The valve duct 70 also includes an end flange 74 which extends radially outwardly from the cylindrical portion 72 at the upstream end of the duct 70. The flange 74 includes a plurality of apertures 76 extending longitudinally through the flange 74. The flange 74, as shown in FIGS. 4 and 5, mates with a flange 4 of an upstream duct 2 to secure the valve apparatus 20 in an appropriate or desired duct environment.

The flange 4 includes a plurality of axially or longitudinally extending apertures 6 which are appropriately aligned with the apertures 76 of the flange 74. The two flanges 4 and 74 are secured together by a plurality of fastening elements, such as screws 8.

The valve duct 70 extends part way through the bore 64 of the downstream valve housing or shell 50. The downstream end of the valve duct 70 includes a valve seat which includes two arcuately extending portions. There is an upper arcuately extending valve seat 82 and a lower arcuately extending valve seat 84. The upper valve seat portion 82 is generally perpendicular to the lower valve seat portion 84. That is, a plane defined by the seat 82 and a plane defined by the seat 84 are substantially perpendicular to each other. The valve seats 82 and 84 comprise valve faces which extend arcuately through the valve duct 70.

A flapper 90 is hingedly secured to the valve duct 70. The flapper 90 comprises an arcuate section of ducting, the radius of which is substantially identical to or the same as the radius of the cylindrical portion 72 of the duct 70. In fact, the flapper 90 comprises a section of the valve duct 70 such that when the valve is in the open position, as shown in FIGS. 2 and 5, the flapper 90 simply comprises an extension of the duct 70. This is best shown in FIG. 5.

The flapper 90 includes two arcuately extending valve faces, an upper face 92, a lower face 94, an arcuately extending outer surface 96 and a tip 98. The faces 92 and 94 are generally perpendicular to each other. That is, planes defined by the faces 92 and 94 intersect each other substantially perpendicularly. The length of the faces 92 and 94 generally coincides with the length of the seats 82 and 84. When the flapper 90 is in its down position, as shown in FIGS. 3 and 4, the face 92 mates with the seat 82 and the face 94 mates with the seat 84 to close the valve apparatus 20.

Within the hanger recess 44 is a valve hanger 100. The valve hanger 100 is appropriately secured to the housing or shell 30 within the recess 44. The valve hanger 100 supports or receives a valve hinge 120 which is secured to the flapper 90.

FIG. 6 is a perspective view of the valve hanger 100 and the valve hinge 120, with the valve hinge 120 shown spaced apart from the valve hanger 100. For the following discussion of the valve hanger 100 and the valve hinge 120, reference will primarily be made to FIG. 6, but reference will also be made to FIGS. 2, 3, 4, and 5.

The valve hanger 100 includes a base 102. A pair of arms 104 and 108 extend outwardly from the base 102. The base 102 is appropriately secured to the cylindrical portion 32 of the upstream shell 30 within the recess 44. The arm 104 includes a downwardly extending recess or hinge slot 106, and the arm 108 includes a downwardly extending recess or hinge slot 110.

The valve hinge 120 is appropriately secured to the exterior of the flapper 90. The hinge 120 includes a base 122 and a pair of outwardly extending arms 124 and 128. The base 122 is secured to the flapper 90 at about the mid point of the arcuate valve face 92. A hinge pin 126 extends inwardly from the arm 124, and a hinge pin 130 extends inwardly from the arm 128. The pins 126 and 130 are appropriately aligned with each other and their inner ends, remote from their arms, are spaced apart from each other.

The pins 126 and 128 extend into, or are received by, the recesses 104 and 110, respectively. It will be noted that the diameter or width of the recesses 108 and 110 is slightly greater than the outer diameter of the pins 126 and 130. This insures that the pins 126 and 130 will not hang up in the recesses 104 and 110. This also allows the arcuate valve faces 92 and 94 of the flapper 90 to seat on or against the two valve seats or surfaces 82 and 84, respectively.

The width or distance between the arms 124 and 128 is slightly greater than the outer width of the arms 104 and 108 to allow for the free movement of the flapper 90 and the hinge 120 as the flapper 90 moves with the hinge 120 and as the hinge 120 is supported by the hanger 100.

Figure 8:
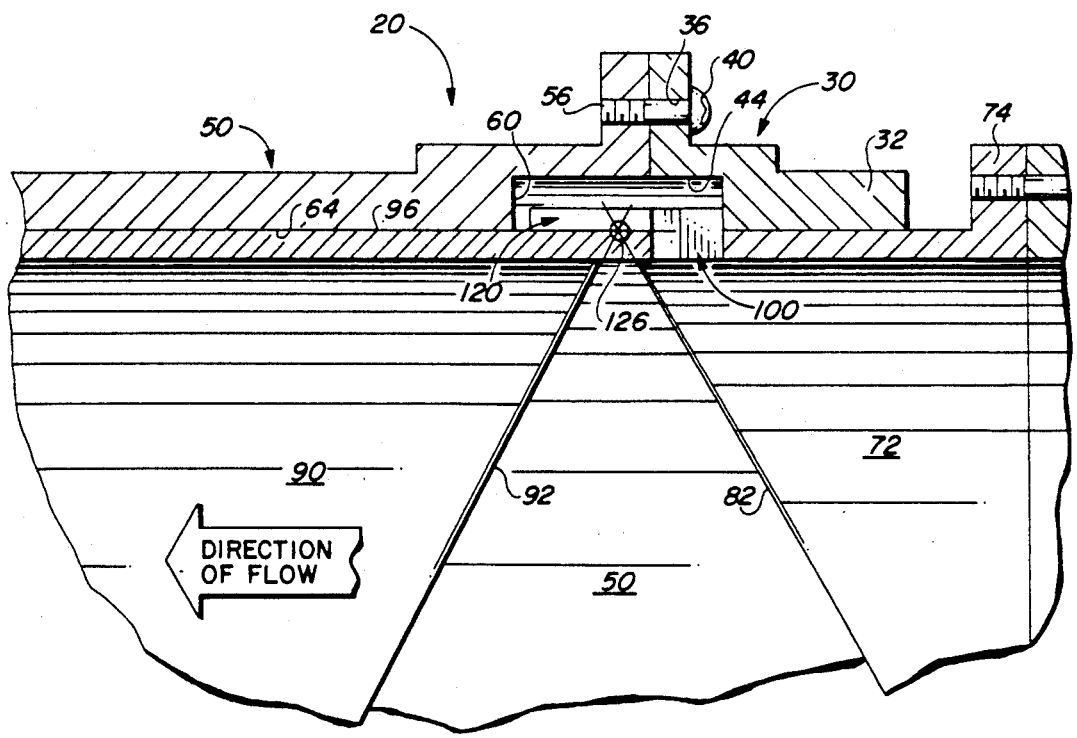
FIG. 8 is an enlarged view of a portion of FIG. 5.

As best shown in FIGS. 7 and 8, which comprise enlarged views of the appropriate portions of FIGS. 4 and 5, the center line of the pins 126 and 130 is aligned with the valve face 92, or with the plane of the valve face 82. When the flapper 90 is disposed on the valve hanger 100, the center line of the pins 126 and 130 is also aligned with the plane of the seat 82. The centerline of the aligned pins 126 and 130 is also tangent to the outer surface 96 of the flapper 90 at a point intersection of the planes of the flapper valve face 92 and the seat surface 82 in any flapper position from full open to closed.

As best shown in FIGS. 2 and 3, and as will be understood from the geometry illustrated in FIGS. 4 and 5 and FIGS. 7 and 8, the hinge pins 126 and 130 are spaced outwardly from the flapper 90 to allow for the appropriate alignment or geometry of the centerline of the hinge pins relative to the plane of the face 92 and the plane of the seat 82 and to the tangency to the outer surface of the flapper 90.

Appropriately secured adjacent to the face 62 of the downstream valve housing or shell 50 is a downstream connector duct 140. The downstream connector duct 140 includes a cylindrical portion 142 with a flange 144 extending radially outwardly from the cylindrical portion 142. The flange 144 includes a plurality of axially or longitudinally extending apertures 146. The cylindrical portion 142 also includes an end face 148 disposed within the bore 64 of the housing 50.

The downstream connector duct 140 is appropriately secured to the housing 50. The purpose of the connector duct 140 is to connect the downstream portion of the valve apparatus 20 to appropriate downstream duct elements, such as a downstream duct 10 shown in FIGS. 4 and 5.

The downstream duct 10 includes a flange 12 extending radially outwardly from the duct. A plurality of apertures 14 extend through the flange 12. The flange 12 of the duct 10 matingly engages the flange 144 of the connector duct 140 to secure the valve apparatus 20 to the duct 10. The apertures 146 and 14 of the connector duct 140 and the duct 10 are appropriately aligned with each other, and a plurality of appropriate fastening elements, such as screws 16, extend through the aligned apertures to secure the duct 10 to the valve apparatus 20.

As shown in FIGS. 4 and 5, the end face 148 of the connector duct 140 is spaced apart longitudinally from the closing recess 66. When the flapper 90 is in its up or open position, as shown in FIG. 5, the outer end or tip 98 of the flapper 90, which is the outer end of the face 94, remote from the face 92, partially overlays the recess 66. That is, the closing recess 66 extends axially from above the flapper 90 to downstream of or below the tip 98 of the flapper 90.

The recess 66 is a relieved portion in the cylinder 52 from the bore 64 which extends for a relatively short axial and arcuate distance, but that distance, or the axial length of the recess and its arcuate width, define a recess having a volume sufficient in size flowing back pressure to flow into the recess 66 and against the outer surface 96 of the flapper 90 to insure that the flapper 90 closes upon reverse fluid flow. That is, back pressure from the fluid flowing into and through the duct 10, through the valve 20, and into the duct 2, will flow backwardly from the duct 10 and into the recess 66 and exert a positive force on the outer portion of the flapper 90 to cause the flapper 90 to move or pivot from its up or open position to its down or closed position, assuming or providing that gravity itself does not close the flapper 90.

The flapper 90 is normally held in its open position by the flow of fluid through the valve 20, or specifically by the flow of fluid through the duct 2, the valve 20, and into the duct 10. Accordingly, when the flow of the fluid through the valve apparatus 20 from the duct 2 and to the duct 10 ceases, the flapper 90 moves or pivots arcuately on its hinge pins 126 and 130 to its closed position, as shown in FIG. 4, by gravity. However, if the valve apparatus 20 is not oriented generally horizontally in the manner illustrated in FIGS. 4 and 5, but rather is oriented vertically or at an angle between vertical and horizontal, the force of gravity may not be sufficient to cause the flapper 90 to pivot or move to its closed position. Moreover, the valve apparatus 20 may also be operated in a gravity free environment. In such cases, the back pressure of any reverse fluid flow into the recess 66 and against the outer arcuate surface 96 of the flapper 90 will cause the flapper 90 to pivot to its closed position.

As shown in FIGS. 4 and 5, the valve hinge 120 is disposed within the hinge recess 60 of the downstream shell 50. The axial length of the recess 60 is sufficient to receive the hinge 120 when the flapper 90 is in its open position, as shown in FIG. 5.

Both the flapper hanger 100 and the flapper hinge 120 are disposed in their respective recesses 44 and 60 so as to not impede the flow of fluid through the valve 20. It will be noted, as best shown in FIGS. 4 and 5, that the inner diameter of the upstream duct 2 and the downstream duct 10 are substantially the same as the inner diameter of the bore 78 of the cylindrical portion 72 of the valve duct 70 and the inner diameter of the flapper 90. The inner diameter of the ducts 2 and 10 are also substantially the same as that of the bore 150 of the downstream connector duct 140.

As shown in FIG. 5, when the flapper 90 is in its up or open position, the flapper 90 simply comprises a continuation of the upstream duct 2 and the valve duct 70, and is appropriately aligned with the connector duct 140 and the downstream duct 6. Accordingly, the flow of fluid through the valve apparatus 20 is relatively free from turbulence, and the flow is accordingly relatively smooth. The portions of the valve 20, including the flapper 90 and the cylindrical portion 72, enhance the smooth flow of the fluid through the apparatus 20 from the upstream duct 2 to the downstream duct 10.

It will be apparent that the valve apparatus 20 is self-sealing and accordingly is substantially free from pressure limitations or restrictions. Moreover, the hinge elements do not bear any stress. Any stress is borne by the relatively large seat portions and valve surfaces or faces.

It will also be noted that, while the upstream and downstream ducts 2 and 10, respectively, to which the valve apparatus 20 is secured, are illustrated as being round, the cross-sectional configuration of the ducts is relatively immaterial. The valve apparatus 20 is smoothly configured for minimum pressure drop through it.

Also, with the employment of the closing recess 66, the valve may be operated in virtually any orientation or even in a gravity-free environment. Thus, the valve apparatus does not depend on gravity for closing. Back pressure from reverse fluid flow in the recess 66 against the outer portion of the flapper 90 is sufficient to close the valve. A relatively small amount of back pressure is sufficient to close the valve apparatus.

As best shown in FIGS. 4 and 5, the diameter of the valve apparatus 20 is only about twice the wall thickness than upstream and downstream ducts 2 and 10, respectively that is downstream shell housing 50, and the upstream shell housing 30, except for their connection flanges, are only above two duct wall thicknesses larger in diameter than the ducts 2 and 10. Thus, the valve apparatus 20 may be inserted into areas where installation space is rather limited, such as aerospace applications.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Check valve apparatus for fluids, comprising, in combination:
    a valve duct through which fluid may flow;
    a first valve seat on the valve duct and defining a first plane;
    a second valve seat on the valve duct and defining a second plane which is substantially perpendicular to the first plane of the first valve seat;
    a flapper pivotally connected to the valve duct and having
        a first valve face defining a third plane and adapted to be disposed against the first valve seat, and the third plane intersects the first plane as the flapper moves between an open position and a closed position in which the first valve face is disposed against the first valve seat,
        a second valve face defining a fourth plane which is substantially perpendicular to the third plane and which second valve face is adapted to be disposed against the second valve seat in the closed position, and
        an outer surface;
    pin means secured to the outer surface of the flapper, including a first pin and a second pin spaced apart from the first pin and aligned with the first pin to provide a common centerline and with the first valve face and first valve seat such that the alignment of the centerline of the first and second pins is tangent to the outer surface at a point on the intersection of the first plane and the third plane as the flapper pivotally moves between a closed position in which the first and second valve faces are respectively disposed on the first and second valve seats for preventing the flow of fluid through the valve duct and an open position for allowing the flow of fluid through the valve duct; and
    valve hanger means adjacent to the first valve seat for receiving the first and second pins of the pin means.

2. The apparatus of claim 1 in which the pin means includes a first arm and a second arm, and the first pin is secured to the first arm and the second pin is secured to the second arm.

3. The apparatus of claim 1 in which the first and second pins extend outwardly from the first and second arms.

4. The apparatus of claim 1 in which the valve hanger means includes
    a first arm,
    a first recess on the first arm for receiving the first pin of the pin means,
    a second arm spaced apart from the second arm, and
    a second recess on the second arm for receiving the second pin of the pin means.

5. The apparatus of claim 4 in which the first and second pins of the pin means have a first diameter, and the first and second recesses have a second diameter which is slightly greater than the first diameter.

6. Check valve apparatus for fluids, comprising, in combination:
    valve shell means adapted to be connected to a duct in which fluid may flow;
    a valve duct disposed in the valve shell means through which the fluid may flow;
    a first valve seat on the valve duct and defining a first plane;

a second valve seat on the valve duct and defining a second plane which is substantially perpendicular to the first plane of the first valve seat;

a flapper pivotally connected to the valve duct and having a first valve face defining a third plane and adapted to be disposed against the first valve seat, and the third plane intersects the first plane at a line, a second valve face defining a fourth plane which is substantially perpendicular to the third plane and which second valve face is adapted to be disposed against the second valve seat, and an outer surface;

pin means secured to the outer surface of the flapper, including a first pin and a second pin having a common centerline and the second pin is spaced apart from the first pin and aligned with the first pin and with the first valve face and first valve seat such that the alignment of the centerline of the first and second pins is tangent to the outer surface at a point on the intersection of the first plane and the third plane as the flapper pivotally moves between a closed position in which the first and second valve faces are respectively disposed on the first and second valve seats and an open position in which the outer surface is disposed adjacent to the valve shell means; and valve hanger means adjacent to the first valve seat for receiving the first and second pins of the pin means.

7. The apparatus of claim 6 in which the pin means includes a first arm and a second arm, and the first pin is secured to the first arm and the second pin is secured to the second arm.

8. The apparatus of claim 6 in which the first and second pins extend outwardly from the first and second arms.

9. The apparatus of claim 6 in which the valve hanger means includes a first arm, a first recess on the first arm for receiving the first pin of the pin means, a second arm spaced apart from the second arm, and a second recess on the second arm for receiving the second pin of the pin means.

10. The apparatus of claim 6 in which the first and second pins of the pin means have a first diameter, and the first and second recesses have a second diameter which is slightly greater than the first diameter.

11. The apparatus of claim 6 in which the valve shell means includes a recess adjacent to the flapper when the flapper is in the open position and into which back pressure of the fluid may flow to urge the flapper from the open position to the closed position to prevent the flow of fluid through the valve duct.

* * * * *